United States Patent
Wollmann et al.

(10) Patent No.: US 9,321,127 B2
(45) Date of Patent: Apr. 26, 2016

(54) APPARATUS FOR JOINING TWO WORKPIECE PARTS HAVING REGIONS WITH DIFFERENT CHARACTERISTICS BY MEANS OF THROUGH-TRANSMISSION WELDING

(71) Applicant: JENOPTIK Automatisierungstechnik GmbH, Jena (DE)

(72) Inventors: Werner Wollmann, Jena (DE); Christoph Steiner, Jena (DE); Wilfried Kraemer, Jena (DE); Alexander Voitsch, Jena (DE)

(73) Assignee: JENOPTIK Automatisierungstechnik GmbH, Jena (DE)

(*) Notice: Subject to any disclaimer, the term of this patent is extended or adjusted under 35 U.S.C. 154(b) by 429 days.

(21) Appl. No.: 14/058,739

(22) Filed: Oct. 21, 2013

(65) Prior Publication Data
US 2014/0110383 A1  Apr. 24, 2014

(30) Foreign Application Priority Data
Oct. 24, 2012 (DE) .................. 10 2012 110 165

(51) Int. Cl.
*B23K 26/00* (2014.01)
*B23K 26/20* (2014.01)
(Continued)

(52) U.S. Cl.
CPC ......... *B23K 26/0063* (2013.01); *B23K 26/0604* (2013.01); *B23K 26/066* (2015.10); *B23K 26/0853* (2013.01); *B23K 26/0869* (2013.01); *B23K 26/20* (2013.01); *B23K 26/24* (2013.01); *B23K 26/244* (2015.10); *B23K 26/26* (2013.01); *B23K 37/0235* (2013.01); *B29C 65/167* (2013.01); *B29C 65/1635* (2013.01); *B29C 65/1654* (2013.01); *B29C 65/1664* (2013.01); *B29C 65/1667* (2013.01); *B29C 65/1687* (2013.01); *B29C 65/1696* (2013.01);
(Continued)

(58) Field of Classification Search
CPC .... B23K 26/0063; B23K 26/20; B23K 26/24; B23K 26/26; B29C 65/1635; B29C 65/1664
USPC .......................... 219/121.63, 121.73, 121.76
See application file for complete search history.

(56) References Cited

U.S. PATENT DOCUMENTS

| 6,465,757 | B1 | 10/2002 | Chen |
| 7,820,937 | B2* | 10/2010 | Perreault ........... A61M 25/0009 219/121.64 |

(Continued)

FOREIGN PATENT DOCUMENTS

| DE | 100 07 391 A1 | 5/2001 |
| DE | 100 46 361 A1 | 4/2002 |

(Continued)

*Primary Examiner* — Samuel M Heinrich
(74) *Attorney, Agent, or Firm* — Duane Morris LLP (57) ABSTRACT

An apparatus for connecting two workpiece parts to form a workpiece by through-transmission welding by means of weld seams running in a preselected weld seam pattern in regions of the workpiece parts having different characteristics is provided. The apparatus has a laser beam source with a plurality of individually controllable laser beam emitters of different power which are arranged adjacently in an X direction and a homogenizer arranged downstream. At least two reflection channels are provided in the homogenizer which run parallel to one another in a Y direction and completely penetrate the homogenizer in a Z direction by a channel depth.

5 Claims, 3 Drawing Sheets (51) Int. Cl.
*B23K 26/26* (2014.01)
*B29C 65/16* (2006.01)
*B23K 26/24* (2014.01)
*B23K 37/02* (2006.01)
*B23K 26/06* (2014.01)
*B23K 26/08* (2014.01)
*B29C 65/00* (2006.01)

(52) U.S. Cl.
CPC ......... *B29C66/1122* (2013.01); *B29C 66/1312* (2013.01); *B29C 66/232* (2013.01); *B29C 66/24244* (2013.01); *B29C 66/41* (2013.01); *B29C 66/45* (2013.01); *B29C 66/545* (2013.01); *B29C 66/61* (2013.01)

(56) References Cited

U.S. PATENT DOCUMENTS 8,981,256 B2 * 3/2015 Stein .................. B29C 65/1687
156/380.9

2005/0077656 A1 * 4/2005 Watanabe .......... B23K 26/0648
264/482
2010/0025387 A1 * 2/2010 Arai .................... B23K 26/0635
219/121.69
2011/0108529 A1 5/2011 Wollmann et al.
2012/0220140 A1 * 8/2012 Kajiyama .......... H01L 21/02532
438/795

FOREIGN PATENT DOCUMENTS

| | | |
|---|---|---|
| DE | 103 39 636 A1 | 3/2005 |
| DE | 10 2009 053 261 A1 | 5/2011 |
| DE | 10 2010 007 717 A1 | 8/2011 |
| DE | 10 2011 055 203 A1 | 5/2013 |
| EP | 0 282 593 A1 | 9/1988 |
| EP | 0 997 261 B9 | 4/2001 |
| EP | 2 322 311 A1 | 5/2011 |
| EP | 2 591 910 A1 | 5/2013 |
| JP | H09 162248 A | 6/1997 |
| WO | WO 2005/023479 A1 | 3/2005 |

* cited by examiner

APPARATUS FOR JOINING TWO WORKPIECE PARTS HAVING REGIONS WITH DIFFERENT CHARACTERISTICS BY MEANS OF THROUGH-TRANSMISSION WELDING

RELATED APPLICATIONS

The present application claims priority benefit of German Application No. DE 10 2012 110 165.5 filed on Oct. 24, 2012, the contents of which is incorporated by reference in its entirety.

BACKGROUND OF THE INVENTION

The invention is directed to an apparatus for joining preferably large-area extended workpiece parts by weld seams by means of through-transmission welding as is described generically in the prior published DE 10 2011 055 203.0.

Generally, to carry out through-transmission welding two workpiece parts to be connected to one another are placed together such that they directly contact one another along at least one contact zone. The workpiece parts may be welded together only within such contact zone. The welding connections may be formed at a point, along a line or over a surface. The area along which the weld connection is made is also often referred to as the joining area.

In through-transmission welding, the first workpiece part is transmissive for the laser radiation and faces a laser source. The second workpiece part is absorptive for the laser radiation. The laser radiation penetrates the first workpiece part, impinges on the surfaces of the second workpiece part, is absorbed in an area adjoining the surface and converted into heat energy. The affected area of the second workpiece part fuses which, due to heat conduction, also brings about a fusing of an adjoining area of the first workpiece part and, therefore, a bonding of both workpiece parts to form a workpiece.

If the two workpiece parts are to be connected to one another along a joining area that is smaller than the contact zone, the impingement of the laser radiation must be limited to the joining area so that other areas within the contact zone are not also welded.

PRIOR ART

Patent document EP 997 261 B9 discloses a process by which two workpiece parts are connected to one another in joining areas by through-transmission welding. In this case, the exposed surface of a transmissive workpiece part is covered by a mask that is opaque to laser light, and laser radiation impinges on the mask in the form of a laser curtain which is generated through collimation and focusing of laser beams of one or more laser sources. The mask is perforated in conformity to the joining areas so that those areas of the contact zone which are not to be joined to one another are masked. The laser radiation blocked by the mask is reflected.

The laser radiation impinges on the surface of the absorbing workpiece part along a laser line, this laser line being divisible into line segments through the configuration of the mask. If the mask is perforated corresponding to a line segment, the line segment is illuminated by the full power of the laser beam; if the mask is not perforated, the respective line segment is not illuminated. Workpiece parts and laser line are moved relative to one another so that the laser line is guided along the joining areas. In so doing, the laser line is constantly adapted to the position and extension of the joining areas being swept over at that moment. The extension of the laser curtain and, therefore, the maximum extension of the laser line can be adjusted by changing the working distance between the laser source and mask. Further, the energy density of the laser line can be adapted by changing the laser radiation output.

It is unfavorable, in terms of energy efficiency, that a portion of the emitted laser radiation is not used and, further, is reflected more or less diffusely, which increases the thermal load on the apparatus and laser source and necessitates additional measures for protecting the operator. Further, it may be disadvantageous for various applications that no means are provided for influencing the power density distribution of the laser radiation on the workpiece surface.

An apparatus in which these disadvantages are overcome is known from Laid Open Application DE 100 07 391 A1. By means of the apparatus disclosed therein influence can be exerted on the power density distribution as well as on the shape of the focal spot generated on the workpiece.

For this purpose, a planar, spatially resolving beam modulator for generating a predefinable power density distribution is arranged between laser beam source and workpiece. The spatial resolution achieved by the beam modulator is achieved through a matrix of individually controllable cells which is arranged in a plane, the cells being arranged perpendicular to this plane in the beam path of the laser beam source. Depending on the quantity of cells, laser radiation coming from the laser beam source is divided into individual constituent beams. The transmission of the corresponding constituent beam can be influenced by each of these mutually independent cells. By these means, in the region of the matrix the power density distribution of the entire laser beam can be selectively adjusted over the channel cross section before it strikes the workpiece.

For modulation of the constituent beams, the cells have either a movable micro-mirror or a micro-polarizer or are constructed as liquid crystal cells. With these devices, the transmission of every cell can be adjusted in a continuous manner from maximum transmission to complete blocking of the beam. This affords a wide range of possibilities for sequential or simultaneous working of materials. In an embodiment of the apparatus, for example, a simultaneous working of the workpiece on a surface limited by the beam modulator is carried out in that only those constituent beams required for working a contour arranged two-dimensionally on the workpiece are unblocked simultaneously. Through a gradation of the transmission of the individual enabled cells with respect to one another, the adjustment of a uniform power density distribution is carried out simultaneously along the shape of the entire contour.

Since the beam modulator is arranged directly in the beam path, the materials used for constructing it must have the highest possible destruction threshold. In order that a laser beam which generally has irregularities in its beam profile that are already close to the destruction threshold at certain points can be prevented from impinging on the beam modulator and in order to increase the dynamic range of the beam modulator, additional steps are needed to homogenize the laser beam before it impinges on the beam modulator. It can be assumed that the exacting demands imposed for the material characteristics and for the functional layout of the beam modulator, the use of additional optics for homogenizing the laser beam striking the beam modulator, and the preparation of a required control represent a significant expenditure for producing the apparatus. Moreover, the principle employed for this purpose can only be meaningfully applied for working small workpieces.

In an apparatus disclosed in Laid Open Application DE 10 2010 007 717 A1, a substantially simpler possibility is described for joining two planar workpiece parts along a large-area extended contact zone in a plurality of joining areas by means of a line-shaped laser beam source comprising a plurality of individually controllable single emitters without use of a mask.

The apparatus comprises a carrier (in this case, receptacle) which is designed so that two workpiece parts extending two-dimensionally in X and Y direction can be positioned relative to one another, a line array (in this case, laser beam source) which is directed to the receptacle, aligned in X direction and comprises a plurality of individually controllable single emitters, preferably laser beam emitters, collectively forming a line array, a device for transporting the line array relative to the receptacle in Y direction, and a control for spatially resolved operation of the single emitters. According to an embodiment example, the line array comprises laser diodes which are arranged adjacent to one another in direction of their slow axis and whose laser beam is collimated in the fast axis direction by a cylindrical lens arranged upstream in the radiating direction corresponding to the Z direction.

The line array which completely spans the contact zone in one extension direction generates a laser curtain which executes a relative movement with respect to the workpiece parts and in so doing sweeps over the entire contact zone in the second extension direction thereof. Through a selective actuation of the individual laser diodes during the relative movement, a corresponding laser power impinges exclusively on the joining areas within the contact zone. Areas outside of the joining areas are not affected by the laser power and therefore need not be masked.

In this way, it was possible to find a comparatively energy-efficient solution for welding larger workpieces. However, the laser radiation impinges on the workpiece parts without being influenced such that the latter, as a rule, have an inhomogeneous power density distribution in the form of a Gaussian profile. Accordingly, it is impossible to generate sharply contoured joining areas with a homogeneous melt, e.g., in the form of narrow, closed welds. As a rule, sharply defined joining areas are demanded when the joining areas are visible to the eye and have a determining influence on the appearance of a workpiece. A homogeneous melt is demanded when the workpiece parts must be joined to one another in a sealing manner.

A device is described in the not prior published DE 10 2011 055 203.0 for connecting two workpiece parts by means of through-transmission welding in which a homogenizer is arranged downstream of a laser beam source. The homogenizer has at least one reflection channel which is continuous in Z direction and whose cross-sectional shape and arrangement corresponds to the shape of a desired weld seam to be introduced in two workpiece parts which are to be connected to one another and which are positioned under the homogenizer. The laser beam source comprises a plurality of single emitters which form a line array and are individually controllable. The line array is oriented in X direction and can be displaced relative to the homogenizer in Y direction.

The homogenizer itself is not transparent to the laser radiation so that it merely passes this laser radiation through the reflection channels to the workpiece parts. The single emitters are advantageously triggered periodically, the radiation thereof being coupled into a reflection channel.

The reflection channels have channel walls which are parallel or inclined relative to one another. The homogenizer can also be used as press-down means for generating a welding pressure between the two workpiece parts.

None of the devices mentioned above discloses that these devices are suitable for or intended for welding workpiece parts having a different material thickness or comprising different materials over the extension thereof or having welds in different welding planes and, therefore, at different distances from the laser beam source.

OBJECTS OF THE PRESENT INVENTION

It is an object of the invention to provide an apparatus for through-transmission welding preferably of large-area extended workpiece parts having different material thickness and/or made of different materials by which reproducible welds with a sharp definition and a homogeneous melt can be produced.

It should also be possible to connect preferably large-area extended workpiece parts by welds of the stated quality in different welding planes.

Further, the apparatus is to be constructed in a simple manner and should make it possible to carry out the welding process quickly by a single pass of the laser beam over the workpiece parts.

The invention provides an apparatus for connecting two workpiece parts to form a workpiece by through-transmission welding by means of weld seams running in a preselected weld seam pattern in regions of the workpiece parts having different characteristics. The apparatus includes a receptacle which is configured such that two workpiece parts extending in X direction and Y direction are positioned relative to one another in the X direction, Y direction and Z direction of a Cartesian coordinate system. It also includes a laser beam source aligned in the radiating direction thereof on the receptacle and, therefore, on workpiece parts positioned therein, which laser beam source has a plurality of individually controllable laser beam emitters which are arranged adjacently in X direction, including a transporting device for transporting the laser beam source relative to the receptacle in Y direction, and including a storage-and-control unit. The above-stated object is met in that a homogenizer is arranged downstream of the laser beam source in a radiating direction, at least two reflection channels are provided in the homogenizer which run parallel to one another in Y direction, completely penetrate the homogenizer in Z direction with a channel depth, and are dimensioned and arranged relative to one another corresponding to a preselected weld seam pattern, and laser beam emitters of different laser power are associated with the at least two reflection channels.

The reflection channels have opposed reflecting channel wall surfaces at which at least a portion of the laser radiation coming from the associated laser beam emitter is repeatedly reflected back and forth.

The laser beam emitters of different laser power include at least laser beam emitters of a comparatively lower laser power and laser beam emitters of a comparatively higher power. Accordingly, with laser radiation emitting over the same duration, parallel weld seams of like quality can be generated simultaneously in regions of the workpiece parts having different characteristics.

The channel wall surfaces are advantageously arranged at an inclination to the radiating direction of the laser beam source such that the laser radiation reflected at the channel wall surfaces has a steeper reflection angle so that the quantity of reflections of the laser radiation can be increased.

In order to prevent laser power losses, it is also advantageous to arrange directly abutting, inclined channel wall surfaces such that they terminate in an edge directed opposite the radiating direction of the laser beam source and converging to a point.

The channel wall surfaces forming a reflection channel in the homogenizer are advantageously individually exchangeable and optionally positionable.

It is also advantageous when the homogenizer is modularly constructed of component assemblies which are adapted to the regions having different characteristics.

BRIEF DESCRIPTION OF THE DRAWINGS

The invention will be described more fully in the following with reference to embodiment examples. The accompanying drawings show.

DESCRIPTION OF THE EMBODIMENTS

The apparatus is adaptable in a simple manner to different characteristics of two workpiece parts which are to be connected to one another, one of which is a workpiece part 11 which is transparent to a laser radiation 22 of a selected laser beam source 2, while the other is a workpiece part 12 which absorbs the laser radiation 22.

To facilitate description of the different characteristics in the workpiece parts 11 or 12, the workpiece parts 11, 12 will be differentiated in the following into a first region B1 and a second region B2 in which they may differ in at least one characteristic or in more than one characteristic.

Each of the two workpiece parts 11, 12, or only one of them, can comprise regions B1, B2 of different material which have a different thermal conductivity and/or a different thermal capacity and/or are differently absorptive for the laser radiation 22 employed. In order to produce welds 3 of like quality in the regions B1, B2 of different material, it is necessary to vary the amount of energy introduced.

Each of the workpiece parts 11, 12, or only one of them, can be so-called 3D parts which are arranged in a receptacle 4 of the apparatus in direction of the laser radiation 22 and have at least two regions B1, B2 having either a different thickness or a different distance from the laser beam source 2 of the apparatus. In the first instance pertaining to the transparent workpiece part 11, the laser radiation 22 impinges on the absorbent workpiece part 12 with different intensities owing to the different transmission in the transparent workpiece part 11. In the latter instance pertaining to the absorbent workpiece part 12, the laser radiation 22 likewise impinges on the absorbent workpiece part 12 with different intensities owing to the different distances from the laser beam source 2.

In order to join workpiece parts having at least two regions B1, B2 of the kind described above with different characteristics by means of weld seams 13 of like quality, laser radiation 22 of like intensity must be directed to the regions B1, B2 with different characteristics for durations of different length or laser radiation 22 of different intensity must be directed to the regions B1, B2 of different characteristics for the same duration. In order to produce the welds 13 during a single relative movement R in the same directional sense between the laser radiation 22 and the workpiece parts 11, 12 which are positioned in the receptacle 4 relative to one another and to the laser radiation 22, the weld seams 13 are formed in a straight line, at right angles to one another and parallel to one another, wherein each weld seam 13 extends over only one of the regions B1, B2 of different characteristics. To this end, a homogenizer 3, described in detail below, which is arranged downstream of the laser beam source 2 in Z direction of the apparatus, equivalent to the radiating direction of the laser beam source 2, comprises at least two reflection channels 33 extending parallel to one another in Y direction of the apparatus. All of the reflection channels 33 collectively form a weld seam pattern identical to the pattern formed by all of the weld seams 13.

In this way, the laser beam source 2 comprising a plurality of individually controllable laser beam emitters adjacently arranged in X direction can introduce welds 13 of like quality in the regions B1, B2 of different characteristics in the workpiece parts 11, 12 either by irradiating with laser radiation 22 of different intensity for the same duration or by irradiating with laser radiation 22 of like intensity for a different duration.

In order to produce weld seams 13 extending parallely in Y direction in regions B1, B2, the laser beam source 2 is designed such that it comprises laser beam emitters configured for different laser powers. In other words, the laser beam source 2 comprises at least two groups of laser beam emitters 21.1, 21.2 of different laser power, namely, laser beam emitters of comparatively higher laser power 21.1 and laser beam emitters of comparatively lower laser power 21.2. A group can also comprise only one individual laser beam emitter 21.1 or 21.2.

To produce weld seams 13 extending in a straight line in X direction by a laser beam source 2 of this type in regions B1, B2 having different characteristics, a uniform input of energy along the weld seams 13 is applied by switching on the individual laser beam emitters 21.1; 21.2 of the groups for different durations.

An advantageous embodiment example for an apparatus according to the invention in which a plurality of weld seams 13 running parallel to one another and a plurality of weld seams 13 at right angles thereto can be produced in regions B1, B2 having different characteristics is described in the following.

This first embodiment form of an apparatus can be used, for example, for welding a workpiece in which regions B1, B2 having different characteristics in workpiece parts 11, 12 extending two-dimensionally at right angles in X direction and Y direction are formed by the different thicknesses of the transparent workpiece part 11. The transparent workpiece part 11 has a first region B1 with a comparatively greater thickness d1 and a second region B2 with a comparatively smaller thickness d2.

Figure 1:
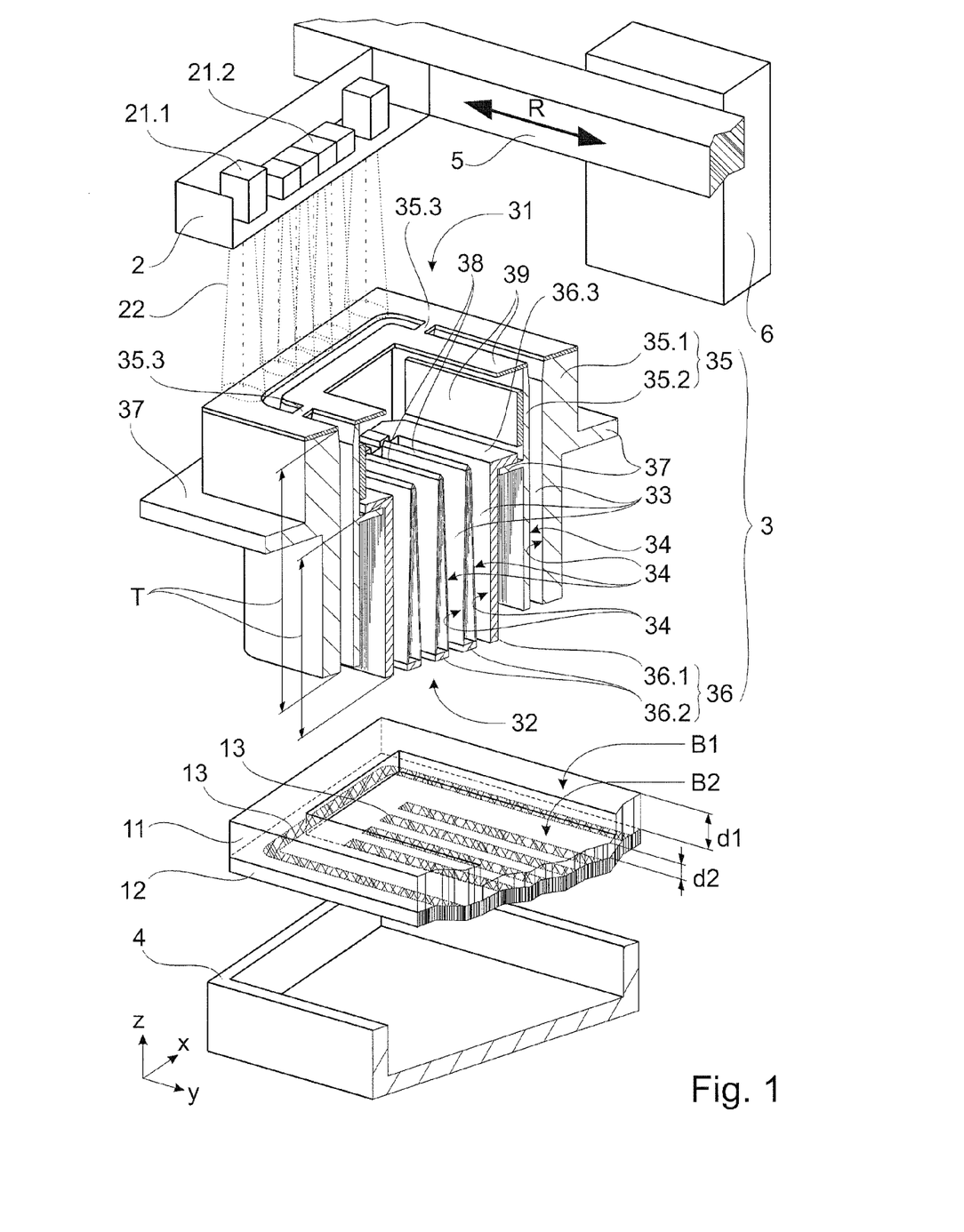
FIG. 1 is the basic layout of an apparatus according to the invention.

FIG. 1 shows a first embodiment example of an apparatus according to the invention. All embodiment forms of the apparatus substantially comprise a laser beam source 2, a homogenizer 3, a receptacle 4 for holding the workpiece parts 11, 12 to be joined, a transporting device 5 and a storage-and-control unit 6. The embodiment forms differ with respect to the layout of the homogenizer and the construction of the laser beam source 2.

As is shown in FIG. 1, the apparatus has the homogenizer 3 which is used to generate the pattern of weld seams 13. The homogenizer 3 is a tool generally of cuboidal shape which is configured in accordance with the extension and three-dimensional shape of the workpiece parts 11, 12 and of the pattern of weld seams 13. It is arranged between the laser beam source 2, which is directed to the receptacle 4 in Z direction, and the transparent workpiece part 11 located in the receptacle 4 and channels the laser radiation 22 coming from the laser beam source 2 through the reflection channels 33 onto the workpiece parts 11, 12 corresponding to the pattern of the weld seams 13.

The homogenizer 3 has a corresponding quantity of reflection channels 33 depending on the pattern of weld seams 13. The reflection channels 33 pass through the homogenizer 3 in Z direction from an upper side 31 of the homogenizer 3 facing the laser beam source 2 to an underside 32 of the homogenizer 3 facing the transparent workpiece part 11 so that the laser radiation 22 which is also emitted in Z direction radiates into the reflection channels 33 and can impinge on the workpiece parts 11, 12. All other regions of the homogenizer 3 are not transparent to the laser radiation 22 employed and shield the workpiece parts 11, 12 from the laser radiation 22. For this reason, the homogenizer 3 is also constructed so as to be at least large enough to cover the workpiece parts 11, 12 in the X dimension and Y dimension thereof.

The remaining surfaces of the homogenizer 3 on the underside 32 between the openings of the reflection channels 33 can be placed upon the transparent workpiece part 11. In this way, the homogenizer 3 can be used at the same time as means for holding down the two workpiece parts 11, 12 to ensure a zero gap between the opposed surfaces of the workpiece parts 11, 12 to be joined, this zero gap being necessary to bring about the weld joint, and to fixedly position the workpiece parts 11, 12 in the receptacle 4.

In order to position the workpiece parts 11, 12 in a defined, stable position relative to one another and relative to the laser beam source 2, the receptacle 4 has a recess with a plane floor and a border perpendicular thereto. The absorbent workpiece part 12 is inserted into the receptacle 4 first and the transparent workpiece part 11 is inserted on top of it.

The homogenizer 3 in FIG. 1 is formed of two component assemblies which are adapted corresponding to regions B1, B2 having different characteristics.

A first component assembly 35 which is adapted for region B1 and by means of which a weld seam 13 extending around the edge area of the workpiece parts 11, 12 is generated accordingly determines the outer dimensions of the homogenizer 3 and simultaneously forms a carrier for further component assemblies. Generally, the outer component assembly of the homogenizer 3 is also used as carrier in other embodiments of the apparatus because this ensures unimpeded access of the laser radiation 22 to further component assemblies.

The first component assembly 35 comprises a perpendicular inner channel wall 35.2 and an outer channel wall 35.1. The inner channel wall 35.2 is arranged inside the outer channel wall 35.1 and a circumferential gap remains between the channel walls 35.1 and 35.2. The reflection channel 33 for the circumferential weld seam 13 in region B1 is formed by parallely opposed channel walls 35.1; 35.2 of the first component assembly 35. Channel walls 35.1; 35.2 have a highly finished surface and are formed as channel wall surfaces 34 reflecting the laser radiation 22. The mechanical connection between the two spaced-apart channel walls 35.1; 35.2 of the first component assembly 35 is produced by means of four narrow webs 35.3 which are arranged inside the reflection channel 33 immediately adjoining the upper side 31 of the homogenizer 3.

Corresponding to the rectangular shape of the workpiece parts 11, 12 and to the weld seam pattern depicted in FIG. 1, the reflection channel of the first component assembly 35 substantially comprises two parallel linear portions oriented in X direction and two parallel linear portions oriented in Y direction, which parallel linear portions meet at the ends and are connected by radial transitions. The radii are as small as possible and need not be considered further as regards adapting the intensity and radiating duration of the laser radiation 22 to the transition between regions the B1, B2 having different characteristics, which will be described later.

The surfaces of the upper side 31 of the first component assembly 35 which are exposed to laser radiation 22 are covered by a thermally insensitive beam absorber 39 to prevent heating of the homogenizer 3. The channel wall surfaces 34 extend right up to the surface of the transparent workpiece part 11 so that the weld seam 13 is as sharply defined as possible. The gap between the channel wall surfaces 34 at the underside 32 of the homogenizer 3 determines the width of the weld seam 13.

To receive the homogenizer 3 in the apparatus, the outward lateral surfaces of the outer channel wall 35.1 have a horizontally arranged circumferential flange 37 to which the homogenizer 3 can be fastened. To hold further component assemblies, the inner surface of the inner channel wall 35.2 facing the center of the first component assembly 35 is likewise provided with a horizontally arranged circumferential flange 37 which is used as support for further component assemblies.

The weld seams 13 which are adapted to region B2 of the workpiece parts 11, 12 are produced by a second component assembly 36 arranged inside the first component assembly 35.

The second component assembly 36 comprises a frame 36.3 which is placed on, and fastened to, the flange 37 at the inner surface of the inner channel wall 35.2 of the first component assembly 35. The weld seams 13 within region B2 are outwardly limited by a perpendicular outer channel wall 36.1 of the second component assembly 36 which runs circumferentially corresponding to the frame 36.3 and extends in Z direction from the frame 36.3 to the surface of the transparent workpiece part 11. The outer channel wall 36.1 of the second component assembly 36 forms a kind of light shaft through which the laser radiation 22 can impinge on the workpiece parts 11, 12 in region B2. The inner side of the outer channel wall 36.1 of the second component assembly 36 forms the channel wall surface 34 that is highly reflective to the laser radiation 22.

Owing to the large surface area enclosed by the outer channel wall 36.1 of the second component assembly 36 forming the light shaft, a plurality of weld seams 13 are required in region B2 to produce a weld joint between workpiece parts 11 and 12. The pattern is formed of a plurality of linear weld seams 13 oriented in Y direction which are distributed at regular intervals over the surface of region B2. Since the weld seams 13 of a pattern are always arranged at right angles to one another, it does not matter in principle whether they are oriented in X direction or in Y direction so long as a required strength of the weld joint can be achieved by the configuration of the pattern of weld seams 13.

To produce the weld seams 13 extending parallely at regular intervals in Y direction in region B2, the light shaft is divided into individual reflection channels 33 by means of perpendicular inner channel walls 36.2 which are oriented in Y direction. Depending on the pattern to be generated of the individual weld seams 13 occupying region B2, the inner channel walls 36.2 of the second component assembly 36 are either suspended from the upper side 31 into the light shaft and fastened to the frame 36.3 or inserted from the underside 32 into the light shaft and connected to the outer channel wall 36.1 of the second component assembly 36. Dividing in this way allows a simple and flexible configuration of the pattern of weld seams 13 in region B2.

The reflecting channel wall surfaces 34 are realized by means of polished sheet metal lining the inner channel walls 36.2 of the second component assembly 36 serving as a holding structure. The width of the weld seams 13 in region B2 is set by the gaps remaining between the opposed channel wall surfaces 34 of two inner channel walls 36.2 at the underside 32 of the second component assembly 36.

Depending on the difference between the comparatively larger thickness d1 in region B1 and the comparatively smaller thickness d2 in region B2 of the transparent workpiece part 11, the channel walls 36.1 and 36.2 of the second component assembly 36 protrude from the first component assembly 35 in Z direction at underside 32. Since the second component assembly 36 is located inside the first component assembly 35, the upper side 31 of the second component assembly 36 is at a greater distance from the laser beam source 2 than the upper side 31 of the first component assembly 35.

The opposed channel wall surfaces 34 of two inner channel walls 36.2 of the second component assembly 36 do not extend perpendicularly but rather so as to be slightly inclined. Accordingly, the inlet openings of the reflection channels 33 facing the upper side 31 are larger than the outlet openings facing the underside 32. Therefore, the cross section of the reflection channels 33 formed between the inner channel walls 36.2 of the second component assembly 36 in X direction and Z direction is funnel-shaped. Between the outlet openings of the reflection channels 33, the second component assembly 36 has a closed underside 32 by which the homogenizer 3 is seated on the surface of the transparent workpiece part 11 and the transparent workpiece part 11 is fixed on the absorbent workpiece part 12.

Above the homogenizer 3, the laser beam source 2 is fastened to a transporting device 5 by means of which the laser beam source 2 can execute the relative movement R in Y direction with respect to workpiece parts 11, 12 and the homogenizer 3. As was already described, the laser beam source 2 is formed of individually controllable laser beam emitters of a comparatively higher laser power 21.1 and laser beam emitters of a comparatively lower laser power 21.2 which are arranged adjacently in X direction. The laser beam emitters 21.1, 21.2 are arranged in the laser beam source 2 at the workpiece parts 11, 12 corresponding to the position of regions B1, B2 of different characteristics. The spacing between the individual laser beam emitters 21.1, 21.2 in X direction is selected such that at least one laser beam emitter 21.1 or 21.2 is associated with each reflection channel 33 extending in Y direction.

The distance between the laser beam source 2 and the workpiece parts 11, 12 in Z direction is selected so as to be at least large enough that the laser beam 22 of the individual laser beam emitters 21.1; 21.2 impinges on the surface of the absorbent workpiece part 12 in a directly adjoining or overlapping manner so that a weld seam 13 running in X direction can be impinged as homogeneously as possible without reflections of the laser radiation 22 at the channel wall surfaces 34.

Because of the comparatively greater thickness d1, region B1 of the transparent workpiece part 11 is less transparent to the laser radiation 22 than region B2 with the comparatively smaller thickness d2 so that the laser radiation 22 has a greater loss of intensity in region B1 than in region B2 when penetrating the transparent workpiece part 11. In order to compensate for this intensity loss and so as to allow both regions B1, B2 to be welded simultaneously and as far as possible at optimum speed during the one relative movement R of the laser beam source 2 in Y direction, the laser beam emitters of comparatively higher laser power 21.1 are used in region B1 and the laser beam emitters of comparatively lower laser power 21.2 are used in region B2.

In view of the fact that the circumferential weld seam 13 in region B1 also has portions running in X direction and extending over the entire width of region B2, the laser beam source 2 would, in theory, have to be formed exclusively of laser beam emitters of comparatively higher laser power 21.1 and the intensity would have to be reduced in region B2. However, exclusive use of laser beam emitters 21.1 would also increase manufacturing costs.

Since the portion of the path of the relative movement required for impingement of the sections of the weld seam 13 oriented in X direction is only very small, it does not make sense to use laser beam emitters of comparatively higher laser power 21.1 in these sections. Therefore, laser beam emitters of comparatively higher laser power 21.1 are only used at the sections of the weld seam 13 in region B1 which run in Y direction. The sections of the weld seam 13 running in X direction in region B1 are welded by means of the laser beam emitters of comparatively lower laser power 21.2 which are provided for the weld seams 13 in region B2 having the comparatively smaller thickness d2 by adapting the intensity or the duration of impingement. Accordingly, the laser beam source 2 usable for this weld seam pattern is formed of two outer laser beam emitters of comparatively higher laser power 21.1 which are located opposite the portions of the weld seam 13 of region B1 which are oriented in Y direction and, between these laser beam emitters 21.1, a quantity of laser beam emitters of comparatively lower laser power 21.2 that corresponds to the quantity of weld seams 13 in region B2.

In order to influence the intensity or impingement duration as a function of the weld seam pattern extending in X direction and Y direction, a selective triggering of the respective laser beam emitters 21.1 or 21.2 and a control of the relative movement R of the transporting device 5 are required. Triggering is carried out by means of the storage-and-control unit 6.

To produce weld seams 13 of equivalent quality in regions B1, B2 simultaneously and at optimal speed, the workpiece parts 11, 12 are advantageously impinged over different impingement durations of laser radiation 22. To this end, the speed of the relative movement R is correspondingly adapted in regions B1 and B2.

For this purpose, the speed is reduced at the start of the relative movement R until the laser radiation 22 coming from the laser beam emitters of comparatively lower laser power 21.2 reaches the same level of intensity as that coming from the laser beam emitters of comparatively higher laser power 21.1. The section of the reflection channel 33 of the first component assembly 35 oriented in X direction is passed over at this speed. The laser beam emitters of comparatively higher laser power 21.1 are not yet in operation at this point in time. After passing this first section, laser beam emitters of higher laser power 21.1 are switched on and the relative movement R is simultaneously increased to normal speed. The laser beam emitters 21.1 and 21.2 then pass over the reflection channels 33 of component assemblies 35 and 36 oriented in Y direction at an optimized speed. Only after the laser beam emitters 21.2 have reached the second section of the reflection channel 33 of the first component assembly 35 oriented in X direction are the laser beam emitters 21.1 switched off again and the relative movement R is decelerated simultaneously until this section is also welded.

The reflection channel 33 running through the first component assembly 35 has a defined channel depth T running in Z direction. This channel depth T is selected such that the laser radiation 22 which generally enters the reflection channels 33 divergently is blended by repeated reflection back and forth at the reflecting parallel channel walls 34 and accordingly impinges on the workpiece parts 11, 12 so as to be distributed in a particularly homogeneous manner in the region of the weld seam 13. Accordingly, the weld seam 13 is also formed very homogeneously.

The channel depth T of the reflection channels 33 of the second component assembly 36 is appreciably smaller than that of the reflection channels 33 in the first component assembly 35 owing to the arrangement inside of the first component assembly 35. However, because the channel wall surfaces 34 in the second component assembly 36 are inclined, the same homogenizing effect can be achieved when the width of the weld seam 13 is comparable to the reflection channel 33 of the first component assembly 35. Due to the funnel-shaped cross section of the reflection channels 33, the expected amount of laser radiation 22 that is repeatedly reflected back and forth is increased so that a sufficient blending can also be achieved in this case. This pertains in particular when directly radiating high-power diode lasers oriented with the fast axis in Y direction are used as laser beam source 2. On the slow axis which is then oriented in X direction, the laser radiation 22 only achieves a simple divergence angle of about 0.5°, which would be too small for sufficient homogenization in the reflection channels 33 with smaller channel depth T.

Further, as a result of the inclined channel wall surfaces 34, a greater proportion of the laser radiation 22 can be concentrated on the weld seams 13 due to the larger inlet opening of the reflection channels 33. Thus in comparison to perpendicular channel wall surfaces, higher intensities can be achieved with the same laser power.

The areas of the second component assembly 36 which are located at the upper surface 31 between individual reflection channels 33 are likewise impinged by the laser radiation 22. To prevent heating of the second component assembly 36 in this region, these areas are covered by inclined, reflecting beam deflectors 38 which deflect the unusable laser radiation 22 by more than 45° relative to the direction of the laser radiation 22 and direct it into beam absorbers 39.

If the distances between the parallel weld seams 13 of region B2 are sufficiently short, the channel wall surfaces 34 at surface 31 can also converge collectively to a narrow edge so that the inlet openings of the reflection channels 33 are arrayed directly adjacent to one another in X direction without gaps. Therefore, beam deflectors 38 can be omitted and the proportion of unusable laser radiation 22 is vanishingly small.

Figure 2:
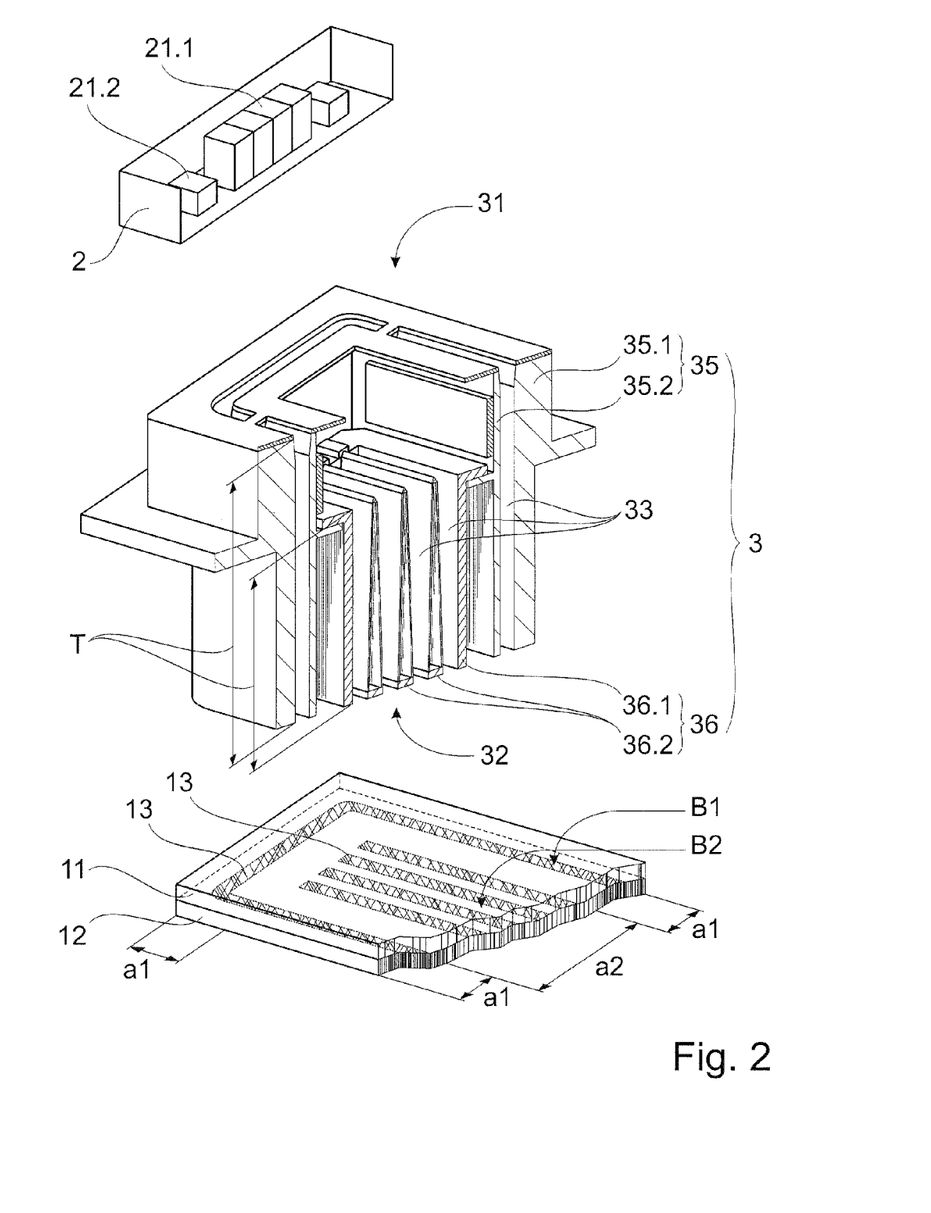
FIG. 2 is the basic layout of the apparatus for welding together workpiece parts having regions of different material.

In another embodiment example shown in FIG. 2, all of the surfaces of the undersides 32 of the first component assembly 35 and of the second component assembly 36 of the homogenizer 3 are located in a common plane. Accordingly, the homogenizer 3 can be seated on all transparent workpiece parts 11 having a plane surface.

Regions B1, B2 having different characteristics are formed by the material of the absorbent workpiece part 12. The latter is comparatively more absorbent a1 for the employed laser radiation 22 in region B1 than in region B2 which is comparatively less absorbent a2. The transparent workpiece part 11 comprises a homogeneous material having no variation in transparency. Region B1 is covered by the first component assembly 35 of the homogenizer 3 and region B2 is covered by the second component assembly 36 of the homogenizer 3.

As is shown in FIG. 2, the homogenizer 3 has the first component assembly 35, which is adapted corresponding to the first region B1 and by means of which the reflection channel 33 is realized for a closed weld seam 13 connecting the edge region of the workpiece parts 11, 12, and the second component assembly 36 which is adapted corresponding to the second region B2 and by means of which the reflection channel 33 is realized for a plurality of parallely arranged weld seams 13 joining the workpiece parts 11, 12 in the center.

Because of the comparatively high absorption a1, a lower intensity of the laser radiation 22 is required in region B1 of the absorbent workpiece part 12 for forming the weld seam 13 than in region B2 with the comparatively lower absorption a2. In order to compensate for these differences in intensity and so that both regions B1, B2 can be welded simultaneously and at optimal possible speed during the one relative movement R of the laser beam source 2, the laser beam source 2 is formed of two outer laser beam emitters of comparatively lower laser power 21.2 across from the sections of the reflection channels 33 of the first component assembly 35 which are oriented in Y direction. In so doing, a quantity of laser beam emitters of comparatively higher laser power 21.1 that corresponds to the quantity of reflection channels 33 of the second component assembly 36 is formed between these laser beam emitters 21.2.

In order to produce weld seams 13 of like quality with optimized machining time with the intensities of the different laser beam emitters 21.1 and 21.2 remaining the same, the workpiece parts 11, 12 must be impinged by laser radiation 22 over a different impingement duration. For this purpose, the speed of the relative movement R is adapted in a corresponding manner in regions B1 and B2.

For this purpose, at the start of the relative movement R the speed is increased until the laser radiation 22 coming from the laser beam emitters of comparatively higher laser power 21.1 only reaches an intensity corresponding to the intensity coming from the laser beam emitters of comparatively lower laser power 21.2. The section of the reflection channel 33 of the first component assembly 35 oriented in X direction is passed over at this speed. After passing this section, the relative movement R is decreased to the normal speed. The laser beam emitters 21.1 and 21.2 then pass over the reflection channels 33 of component assemblies 35 and 36 oriented in Y direction at an optimized speed. Only when the laser beam emitters 21.1 have reached the second section of the reflection channel 33 of the first component assembly 35 oriented in X is the relative movement R increased again until this section is also welded.

It would be equally possible to operate at a constant speed of the relative movement R with reduced intensity of the laser radiation 22 proceeding from the laser beam emitters of comparatively higher laser power 21.1.

Figure 3:
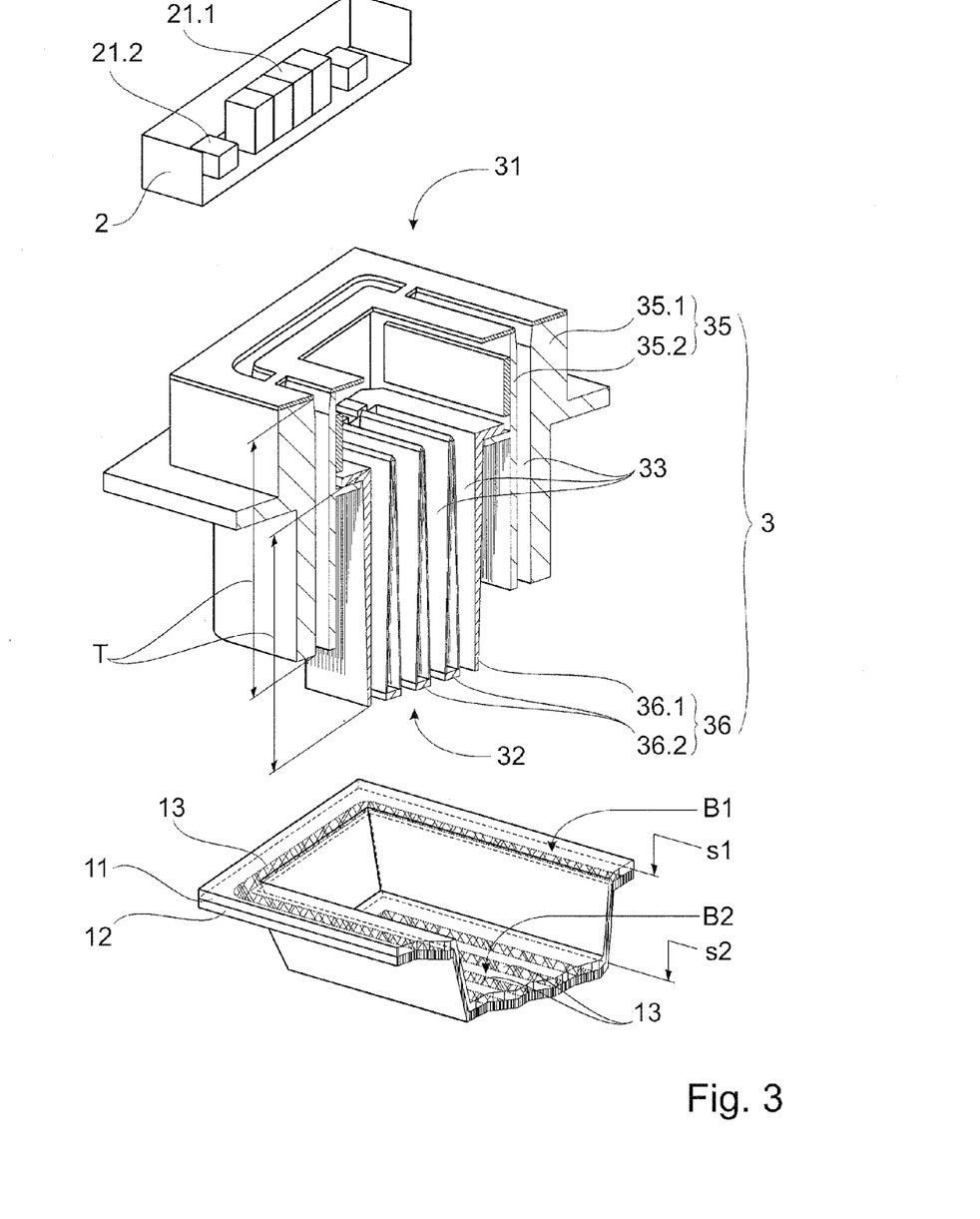
FIG. 3 is the basic layout of the apparatus for welding together workpiece parts having regions in different welding planes.

In a further embodiment example illustrated in FIG. 3, the underside of the homogenizer 3 has a significant difference between the distances of the first region B1 and second region B2 from the laser beam source 2. A homogenizer 3 of this kind can be used for workpiece parts 11, 12 that are formed three-dimensionally in Z direction.

Regions B1, B2 of different characteristics in workpiece parts 11, 12 are formed in that the weld seams 13 are positioned in different welding planes, wherein the welding plane is defined by the distance of the weld seam 13 from the laser beam source 2 in Z direction. Region B1 has a comparatively short distance s1 from laser beam source 2 and region B2 has a comparatively long distance s2 from laser beam source 2.

For receiving workpiece parts 11, 12 of this kind, the receptacle 4, not shown in FIG. 3, has recesses, stops, surfaces or the like measures which are shaped or arranged in conformity to the three-dimensional shape of the workpiece parts 11, 12 and at which the workpiece parts 11, 12 are fixed in all three spatial dimensions.

Due to the short distance s1 of the welding plane in the first region B1, the laser radiation 22 impinges on workpiece parts 11, 12 at a higher intensity than in the welding plane with the long distance s2 that is farther from the laser beam source 2. In order to produce weld seams 13 of like quality, the differences in intensity resulting at the different distances s1; s2 must be compensated. For this purpose, the laser beam emitters of comparatively lower laser power 21.2 are allocated to region B1 and the laser beam emitters of comparatively higher laser power 21.1 are allocated to region B2. Accordingly, the laser beam source 2 is formed by two outer laser beam emitters of comparatively lower laser power 21.2 across from the sections of the reflection channels 33 of the first component assembly 35 which are oriented in Y direction and, between these laser beam emitters 21.2, by a quantity of laser beam emitters of comparatively higher laser power 21.1 that corresponds to the quantity of reflection channels 33 of the second component assembly 36.

The welding of the portions of the weld seam 13 in region B1 which are oriented in X direction by means of the laser beam emitters of comparatively higher laser power 21.1 can be carried out in the same way as in the embodiment example described above.

If course, it is also possible that workpiece parts 11, 12 having more than only two regions B1, B2 of different characteristics or having a combination of all three of the regions B1, B2 of different characteristics mentioned above can be welded by means of the apparatus when the laser beam source 2 is adapted correspondingly and the relative movement R and switch-on and switch-off times of the individual laser beam emitters 21.1, 21.2 are controlled correspondingly by the storage-and-control unit 6.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS 11 transparent workpiece part 11
12 absorbent workpiece part 12
13 weld seam
B1 first region of a characteristic of the workpiece parts
B2 second region of a characteristic of the workpiece parts
d1 comparatively greater thickness
d2 comparatively smaller thickness
s1 comparatively short distance
s2 comparatively long distance
a1 comparative high absorption
a2 comparatively low absorption
2 laser beam source
21.1 laser beam emitters of comparatively higher laser power
21.2 laser beam emitters of comparatively lower laser power
22 laser radiation
R relative movement
3 homogenizer
31 upper side of the homogenizer
32 underside of the homogenizer
33 reflection channel
34 channel wall surfaces
35 first component assembly
35.1 outer channel wall of the first component assembly
35.2 inner channel wall of the first component assembly
35.3 web
36 second component assembly
36.1 outer channel wall of the second component assembly
36.2 inner channel wall of the second component assembly
36.3 frame
37 flange
38 beam deflector
39 beam absorber
T channel depth
4 receptacle
5 transporting device
6 storage-and-control unit

What is claimed is:

1. An apparatus for connecting two workpiece parts to form a workpiece by through-transmission welding by means of weld seams running in a preselected weld seam pattern in regions of the workpiece parts having different characteristics, including a receptacle configured such that two workpiece parts extending in an X direction and a Y direction are positioned relative to one another in the X direction, Y direction and Z direction of a Cartesian coordinate system, comprising a laser beam source aligned in the direction of radiation of said laser beam on the receptacle and, therefore, on workpiece parts positioned therein; said laser beam source having a plurality of individually controllable laser beam emitters which are arranged adjacently in the X direction; a transporting device for transporting the laser beam source relative to the receptacle in the Y direction, a storage-and-control unit; a homogenizer arranged downstream of the laser beam source in the direction of radiation; at least two reflection channels provided in said homogenizer which run parallel to one another in the Y direction, completely penetrate the homogenizer in the Z direction with a channel depth and are dimensioned and arranged relative to one another corresponding to a preselected weld seam pattern, one of said laser beam emitters being of different laser power associated respectively with the at least two reflection channels, said reflection channels having opposed reflecting channel wall surfaces at which at least a portion of laser radiation coming from the associated laser beam emitter is repeatedly reflected back and forth, said laser beam emitters of different laser power include at least laser beam emitters of a comparatively lower laser power and laser beam emitters of a comparatively higher power so that, with laser radiation emitting over the same duration, parallel weld seams of like quality can be generated simultaneously in regions of the workpiece parts having different characteristics.

2. The apparatus according to claim 1, wherein said channel wall surfaces are arranged at an inclination to the radiating direction of the laser beam source such that the laser radiation reflected at the channel wall surfaces has a steeper reflection angle so that the quantity of reflections of the laser radiation (22) can be increased.

3. The apparatus according to claim 1, wherein said directly abutting inclined channel wall surfaces are arranged so as to terminate in an edge directed opposite the radiating direction of the laser beam source and converging to a point in order to prevent laser power losses.

4. The apparatus according to claim 1, wherein said channel wall surfaces forming a reflection channel in the homogenizer are individually exchangeable and optionally positionable.

5. The apparatus according to claim 1, wherein said homogenizer is modularly constructed of component assemblies which are adapted to the regions having different characteristics.

* * * * *